(12) United States Patent
Hayton et al.

(10) Patent No.: US 9,584,515 B2
(45) Date of Patent: Feb. 28, 2017

(54) ENTERPRISE SYSTEM AUTHENTICATION AND AUTHORIZATION VIA GATEWAY

(71) Applicant: Citrix Systems, Inc., Fort Lauderdale, FL (US)

(72) Inventors: Richard Hayton, Cambridge (GB); Andrew Innes, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 84 days.

(21) Appl. No.: 14/265,661

(22) Filed: Apr. 30, 2014

(65) Prior Publication Data

US 2015/0319174 A1    Nov. 5, 2015

(51) Int. Cl.
| | | |
|---|---|---|
| G06F 21/00 | (2013.01) | |
| H04L 29/06 | (2006.01) | |
| H04W 12/06 | (2009.01) | |

(52) U.S. Cl.
CPC ...... *H04L 63/0884* (2013.01); *H04L 63/0815* (2013.01); *H04L 63/10* (2013.01); *H04L 63/205* (2013.01); *H04W 12/06* (2013.01)

(58) Field of Classification Search
CPC ............... H04L 63/0884; H04L 63/205; H04L 63/0815; H04L 63/10; H04W 12/06
See application file for complete search history.

(56) References Cited

U.S. PATENT DOCUMENTS 6,324,648 B1  11/2001  Grantges, Jr.
6,892,307 B1 *  5/2005  Wood ............... G06F 21/41
                                                     713/155
7,707,630 B2   4/2010  Childs et al.
(Continued)

FOREIGN PATENT DOCUMENTS

| JP | WO 2013/175901 A1 * | 11/2013 |
|---|---|---|
| WO | 2008024454 A1 | 2/2008 |
| WO | 2014048769 A1 | 4/2014 |

OTHER PUBLICATIONS

PCT Search Report dated Feb. 10, 2015 for related PCT application PCT/US2014/044647.

*Primary Examiner* — Kendall Dolly
(74) *Attorney, Agent, or Firm* — Banner & Witcoff, Ltd.

(57) ABSTRACT

Methods and systems are disclosed for providing approaches to authenticating and authorizing client devices in enterprise systems via a gateway device. The methods and systems may include passing, by a computing device to an enterprise device, a request transmitted by a client device for access to an enterprise resource, and transmitting, by the computing device, authentication credentials associated with the client device with a request for authorization information associated with the enterprise resource. The methods and systems may also include receiving, by the computing device, the authorization information associated with the enterprise resource, transmitting, by the computing, the request transmitted by the client device for access to the enterprise resource with the received authorization information associated with the enterprise resource, and passing, by the computing device to the client device, information associated with the requested enterprise resource based on the received authorization information associated with the enterprise resource.

17 Claims, 8 Drawing Sheets

(56) References Cited

U.S. PATENT DOCUMENTS

| | | | |
|---|---|---|---|
| 7,954,144 B1* | 5/2011 | Ebrahimi | H04L 63/102 |
| | | | 709/227 |
| 8,713,658 B1* | 4/2014 | Tidd | H04L 63/0815 |
| | | | 713/155 |
| 2007/0169185 A1 | 7/2007 | Readshaw | |
| 2013/0265940 A1 | 10/2013 | Su et al. | |
| 2014/0109078 A1 | 4/2014 | Lang et al. | |

* cited by examiner

ENTERPRISE SYSTEM AUTHENTICATION AND AUTHORIZATION VIA GATEWAY

FIELD

Aspects described herein generally relate to authentication of client devices within enterprise systems. More specifically, certain aspects herein provide techniques to authenticate and authorize client devices in enterprise systems via a gateway device.

BACKGROUND

Mobile devices, such as smart phones, personal digital assistants, tablet computers, other types of mobile and non-mobile computing devices, are becoming increasingly popular. More and more people are using mobile devices in personal and business settings for a variety of purposes. As more people use mobile devices, more and more data is transmitted via networks associated with these mobile devices. This can lead to increased chatter and can cause a drain on network resources.

Client devices that request access to enterprise resources must first be authenticated on that resource before being allowed access to any services provided by that resource. Typically, client devices must communicate with resources for authentication and authorization before being granted access. Additionally, a client device may need to be authenticated each time it requests access to an enterprise resource. These frequent communications provide for wear and tear on a client device and result in wasted network resources.

Thus, there is a need to reduce the amount of chatter between client devices and enterprise systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards providing approaches to authenticating and authorizing client devices in enterprise systems via a gateway device.

One or more aspects of the disclosure provide for a method that may include passing, by a computing device to an enterprise device, a request transmitted by a client device for access to an enterprise resource; and transmitting, by the computing device to the enterprise device, information comprising authentication credentials associated with the client device and further comprising a request for authorization information associated with the enterprise resource. The method may also include receiving, by the computing device and in response to a successful authentication of the authentication credentials associated with the client device, the authorization information associated with the enterprise resource; and transmitting, by the computing device to the enterprise resource, the request transmitted by the client device for access to the enterprise resource with the received authorization information associated with the enterprise resource. The method may further include passing, by the computing device to the client device, information associated with the requested enterprise resource based on the received authorization information associated with the enterprise resource.

One or more aspects of the disclosure provide for a system that includes at least one processor; and at least one memory storing instructions that, when executed by the at least one processor, cause the system to perform one or more steps. The steps the system may perform may include passing, by a computing device to an enterprise device, a request transmitted by a client device for access to an enterprise resource; and transmitting, by the computing device to the enterprise device, information comprising authentication credentials associated with the client device and further comprising a request for authorization information associated with the enterprise resource. The steps may also include receiving, by the computing device and in response to a successful authentication of the authentication credentials associated with the client device, the authorization information associated with the enterprise resource; and transmitting, by the computing device to the enterprise resource, the request transmitted by the client device for access to the enterprise resource with the received authorization information associated with the enterprise resource. The steps may also include passing, by the computing device to the client device, information associated with the requested enterprise resource based on the received authorization information associated with the enterprise resource.

One or more aspects of the disclosure provide for one or more non-transitory computer-readable storage media having instructions stored thereon, that when executed by one or more processors, may cause the one or more processors to perform steps. The steps that the one or more processors perform may include passing, by a computing device to an enterprise device, a request transmitted by a client device for access to an enterprise resource; and transmitting, by the computing device to the enterprise device, information comprising authentication credentials associated with the client device and further comprising a request for authorization information associated with the enterprise resource. The steps may also include receiving, by the computing device and in response to a successful authentication of the authentication credentials associated with the client device, the authorization information associated with the enterprise resource; and transmitting, by the computing device to the enterprise resource, the request transmitted by the client device for access to the enterprise resource with the received authorization information associated with the enterprise resource. The steps may also include passing, by the computing device to the client device, information associated with the requested enterprise resource based on the received authorization information associated with the enterprise resource.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
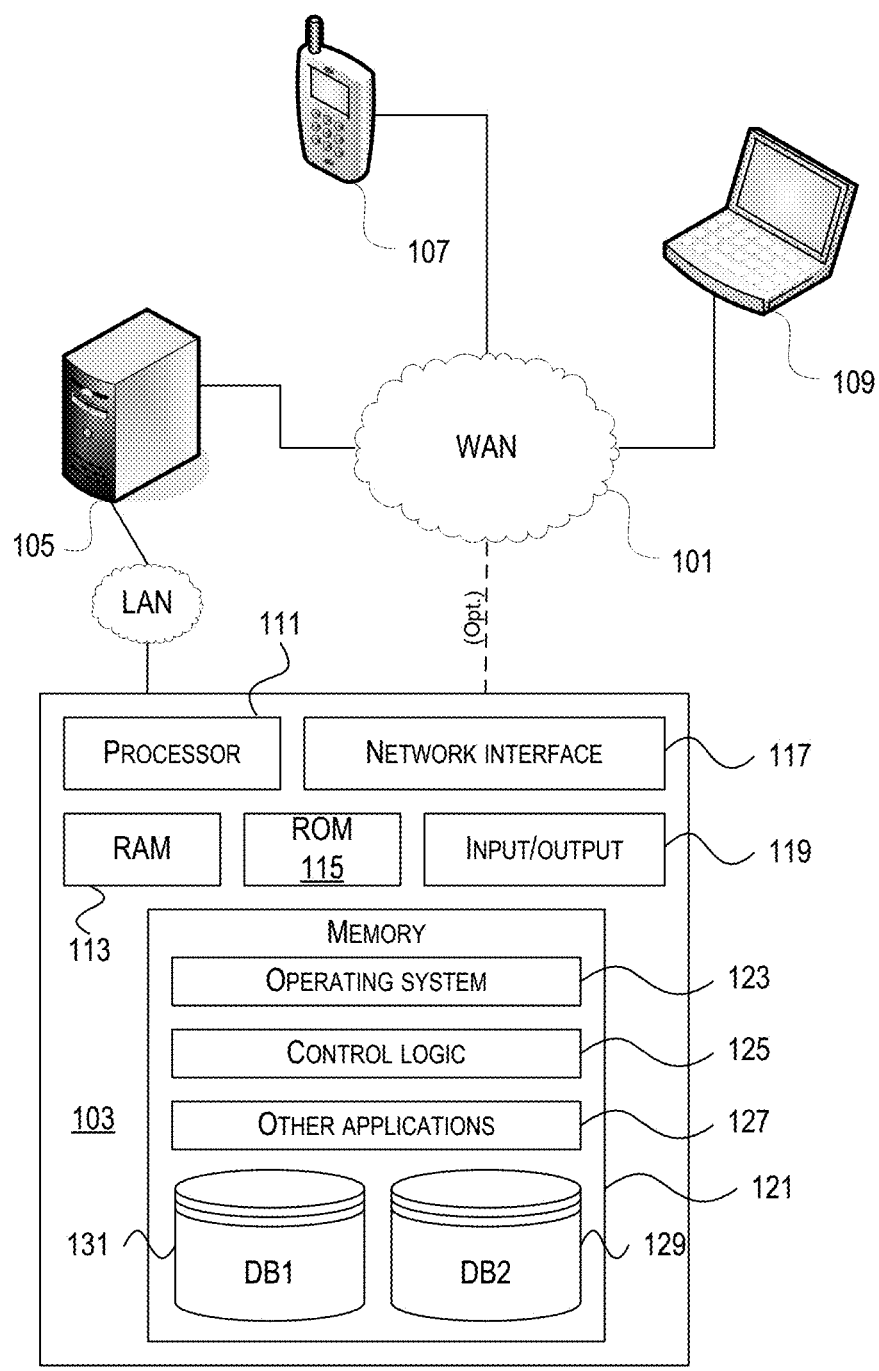
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
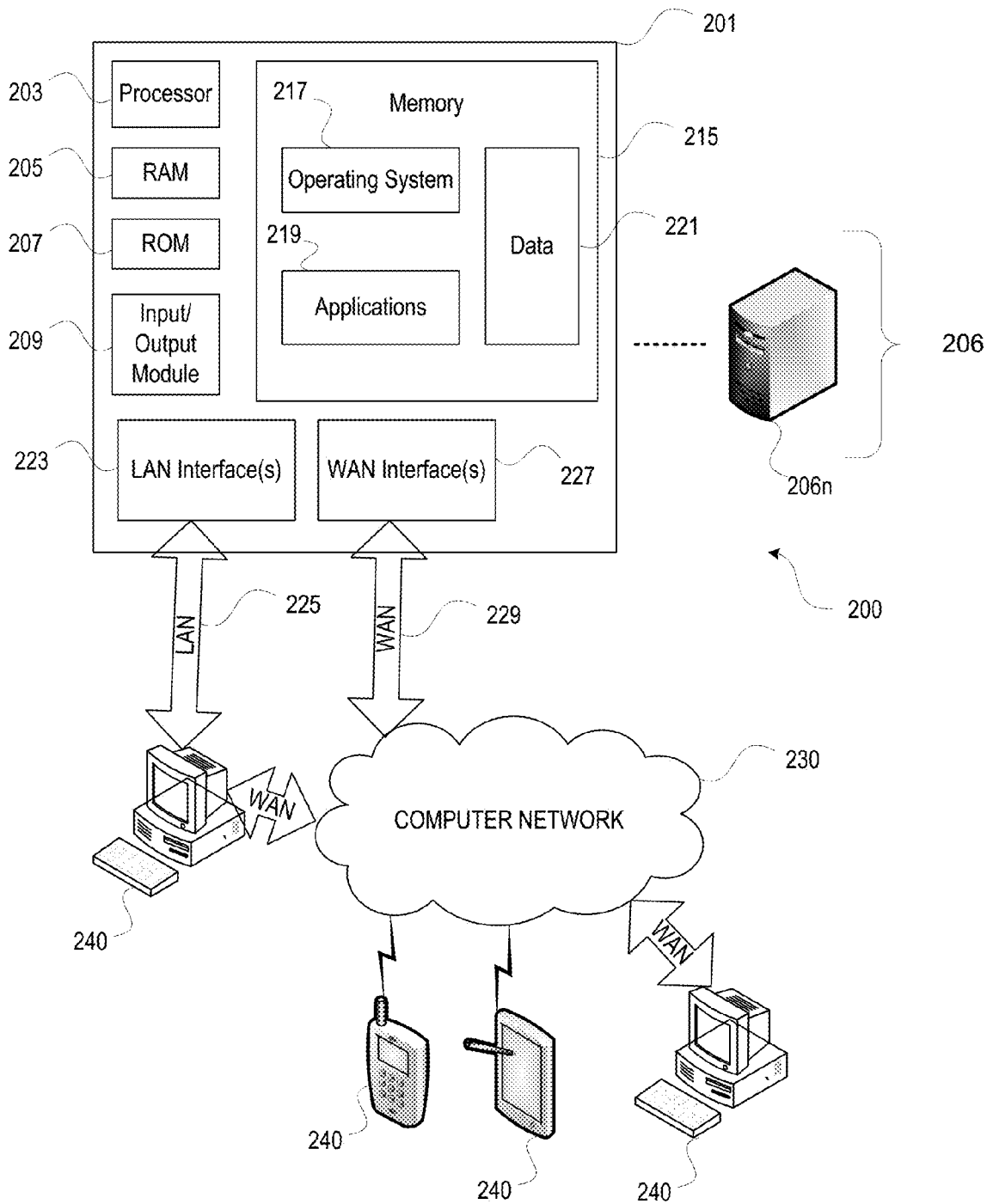
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
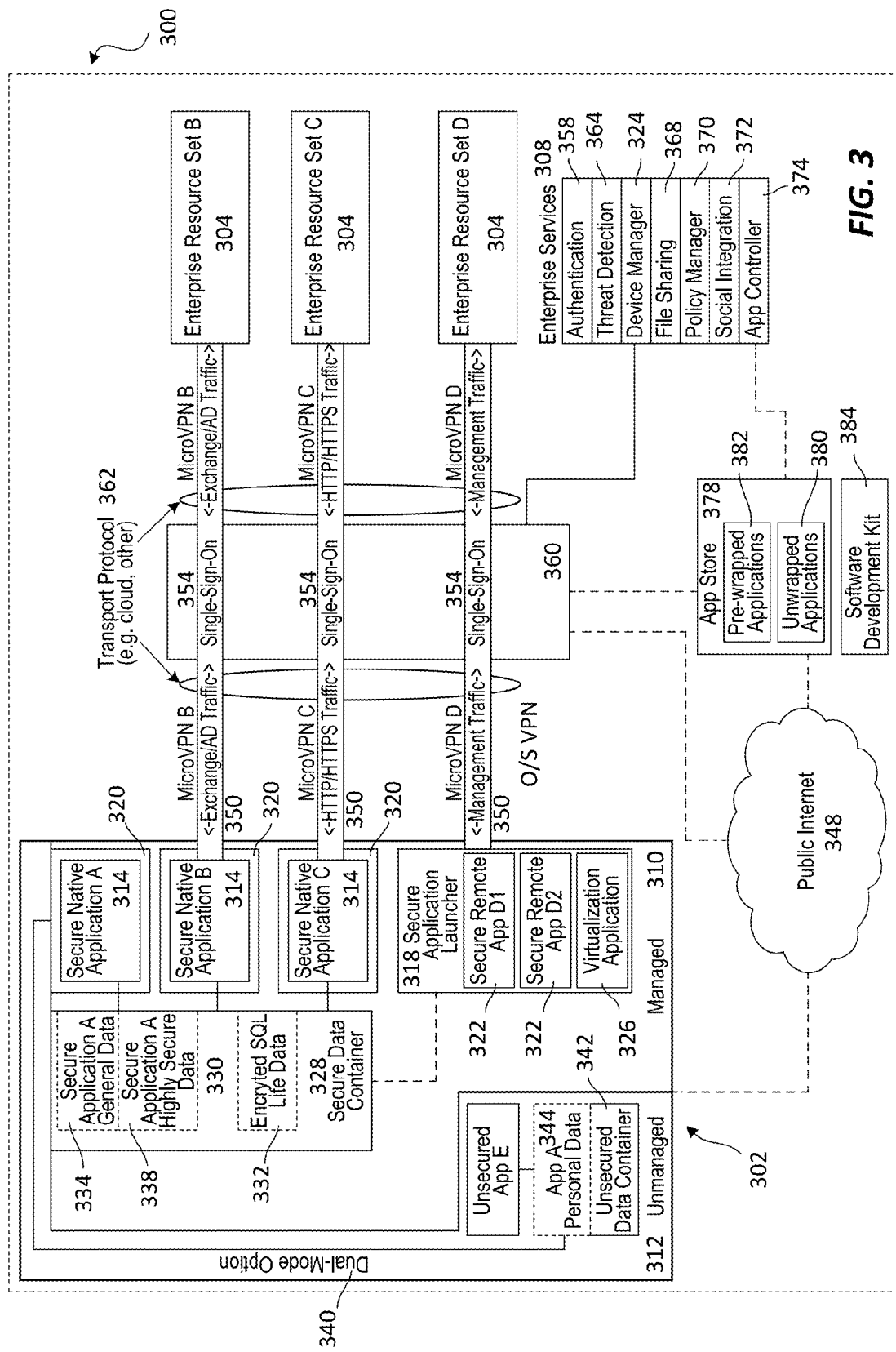
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, Hyper-Text Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 580, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
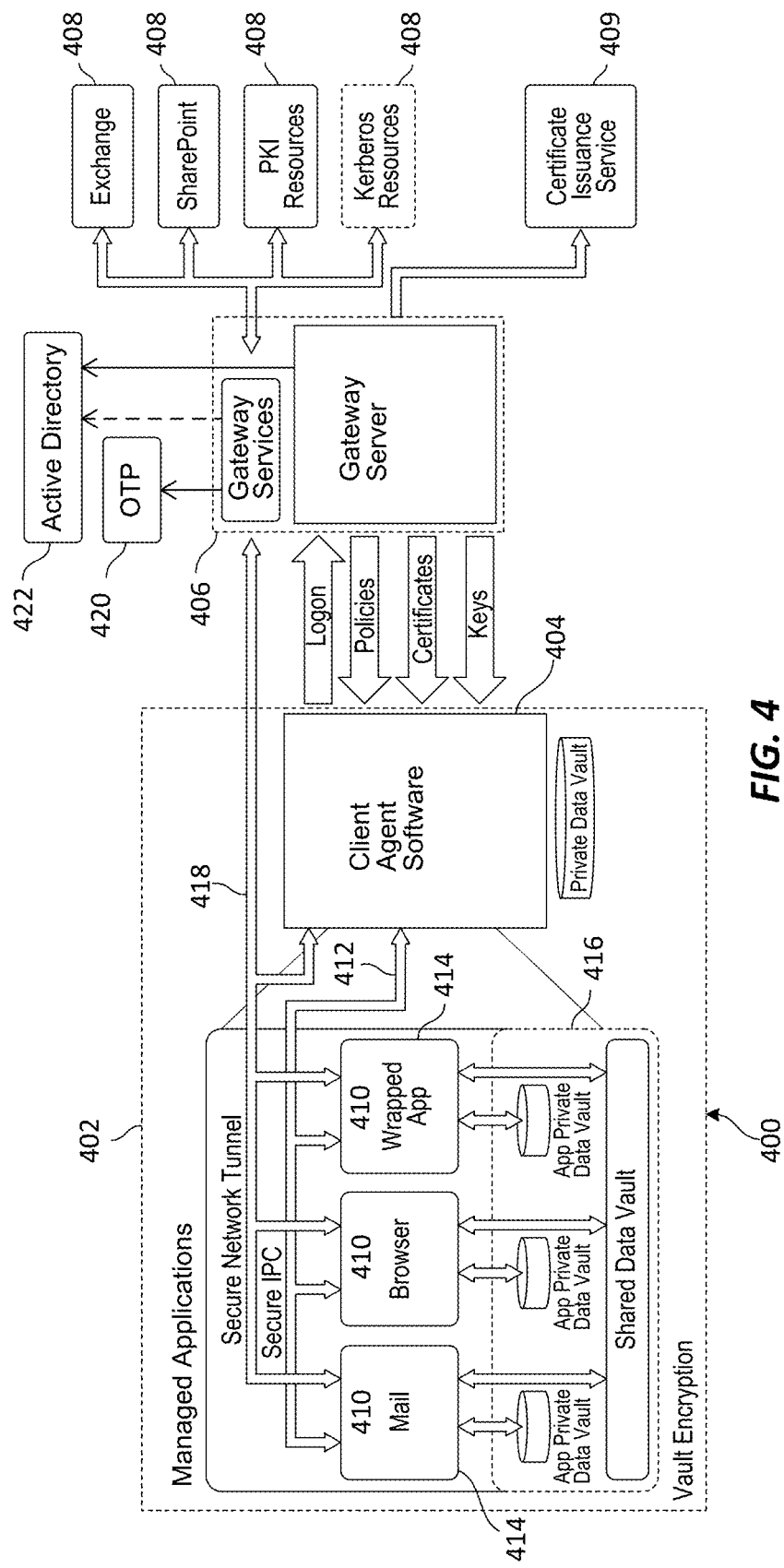
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Figure 5:
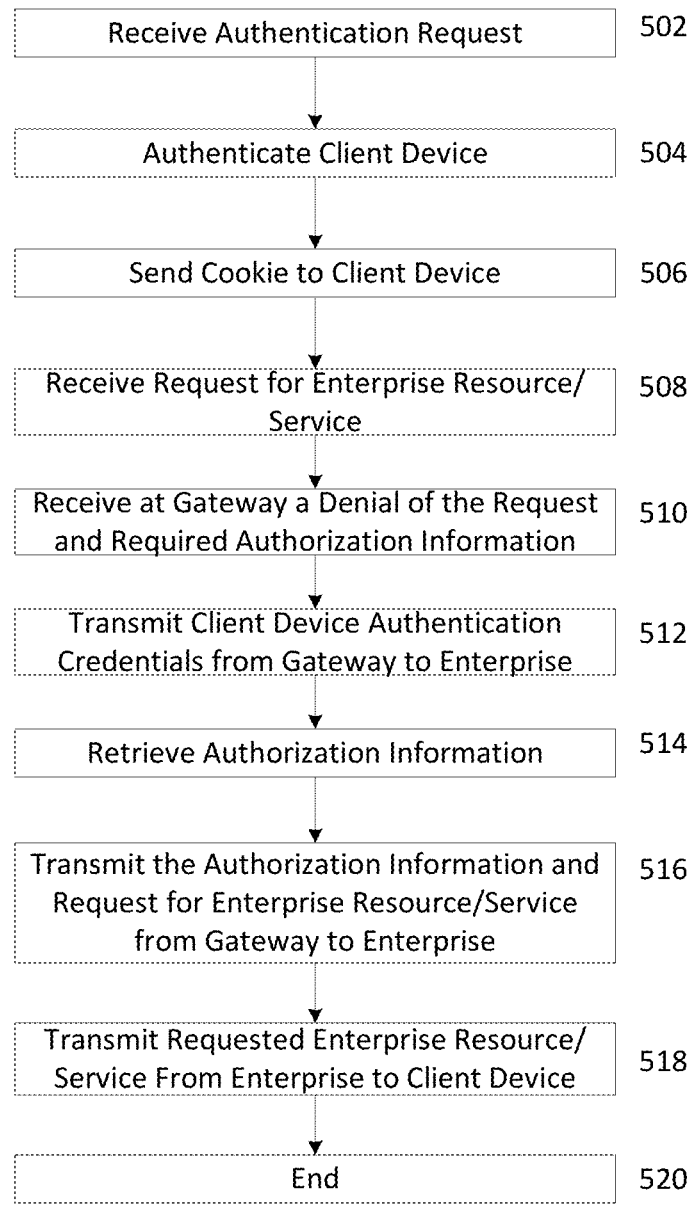
FIG. 5 depicts an illustrative flow diagram illustrating an example process of authenticating and authorizing client devices in enterprise systems using a gateway device in accordance with one or more features described herein.
Figure 6:
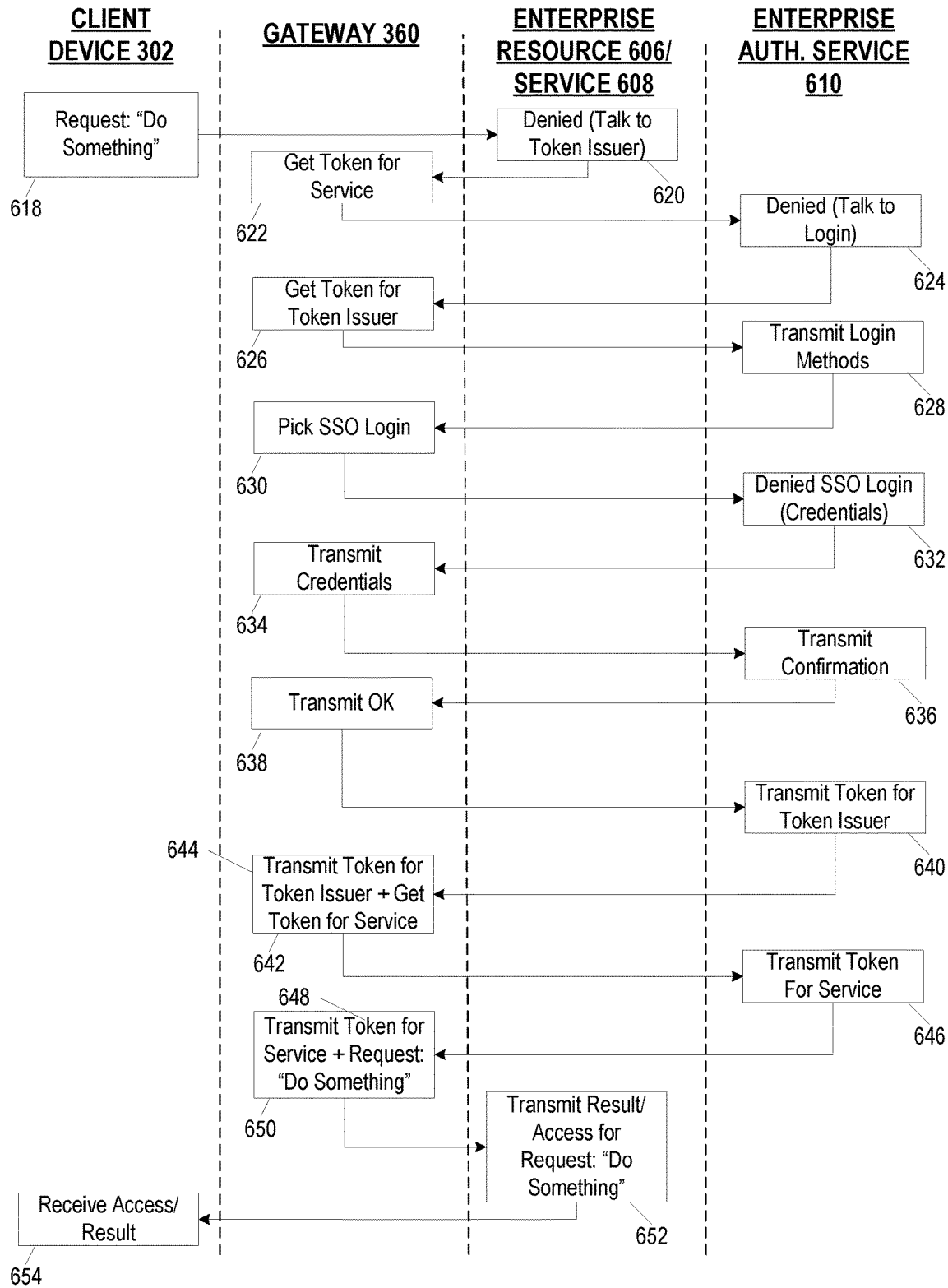
FIG. 6 depicts an illustrative system illustrating a flow schematic of authenticating and authorizing a client device in enterprise systems using a gateway device in accordance with one or more features described herein.
Figure 7:
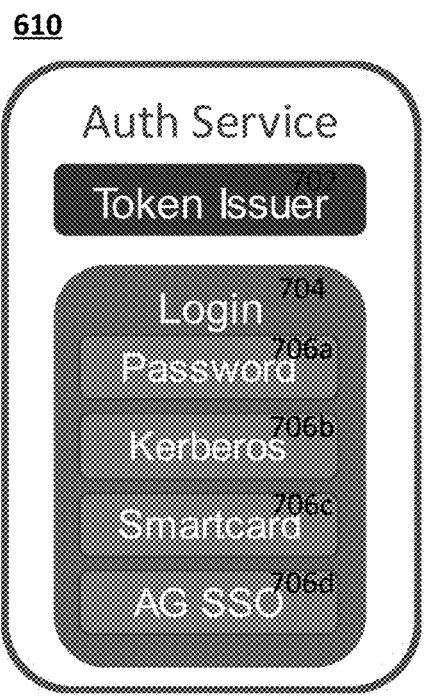
FIG. 7 depicts an illustrative schematic of an authentication service in accordance with one or more features described herein.

FIG. 5 is an illustrative flow diagram and FIGS. 6 and 7 are illustrative schematic diagrams all illustrating various examples of features, methods, and systems of authenticating and authorizing client devices in enterprise systems using a gateway device. The features and methods described below in reference to FIGS. 5-7 may be performed by a computing device or combination of devices, such as the various computing devices and systems shown in FIGS. 1-4, and may be implemented within various different types of enterprise systems, such as the illustrative systems shown in FIGS. 3 and 4, or any other enterprise system (i.e., any computing device that may require authentication when providing access to resources). The features, steps, and methods described below in reference to FIGS. 5-7 may be performed in any order, and one or more features, steps, or methods may omitted and/or added. FIGS. 5-7 relate to authenticating a client device on a gateway and on an enterprise system. FIGS. 5-7 also relate to authorizing a client device and/or gateway device access to enterprise system resources. For example, a user at terminal 240 or client device 302 or 402 may communicate with an enterprise system through gateway 360 or 406, may provide authentication credentials to validate the user's or client device's identity, and then may request and access the various resources and services of the enterprise system. FIGS. 5-7 may use various protocols, such as Security Assertion Markup Language (SAML), which is an XML-based method for exchanging authentication and authorization information.

The various embodiments and examples described in reference to FIGS. 5-7 may include several features and potential advantages for authentication and resource access control to users/client devices in enterprise systems. As described in more detail herein, certain embodiments may allow for a client device (e.g., managed mobile device, managed desktop device, etc.) to reduce the amount of communication it receives and transmits to enterprise systems and resources. Disclosed embodiments allow for reducing chatter to and from the client device, thus freeing up network resources, by reducing the number of calls (e.g., HTTP requests) a client device must make. Disclosed embodiments allow for a client device session authentication on a gateway device, and allow the gateway device to act as a proxy for the client device when communicating with enterprise resources requested by the client device. Thus, the gateway device (and/or any associated components thereof) may negotiate with the requested enterprise resources on behalf of the client device, until the enterprise resource grants/allows access to the client device and/or gateway. During the negotiation, the gateway device may transmit calls, requests, responses, and the like. The gateway may also retrieve/access/request authentication information (e.g., passwords, login credentials, etc.) and/or authorization information (e.g., cookies, tokens, etc.), and may transmit this retrieved information to the enterprise resource. According to disclosed embodiments, client devices may not need to receive, transmit, or otherwise handle authentication information (e.g., tokens), but instead, this authentication information may be maintained, kept, or otherwise managed by the gateway device. This may reduce the amount of processing and/or storage required/needed on client devices, as some tokens may be 4 KB in size, and, reduce the amount of communications transmitted on a network. While tokens may be an example of authorization information disclosed herein, any other type of authorization information may be used according to the disclosed aspects.

In accordance with one or more disclosed features described herein, disclosed embodiments allow for achieving a balance of various factors, such as separating protocol payload handling from authentication token logic. Disclosed embodiments (e.g., gateway embodiments) may include, be implemented with, or be otherwise associated with a packet engine core, which may be implemented in a state-machine driven packet-in to packet-out style. According to some aspects, the packet engine core may be implemented in a programming language, such as C (although other languages may be used). The packet engine may implement processing logic that may be implemented in an open systems interconnection (OSI) model. The OSI model defines a networking structure that may implement networking protocols in seven layers. The seven layers may include a physical layer (L1), data link layer (L2), network layer (L3), transport layer (L4), session layer (L5), presentation layer (L6), and application layer (L7). In the OSI model, control may be passed from one layer to the next, starting with the application layer (L7). Disclosed embodiments may implement processing logic on any of the L2-L7 layers and may comply with (or selectively deviate from, as appropriate) one or more networking standards throughout these layers.

Disclosed embodiments may implement many functions that might otherwise be performed by separate components in an operating system. These functions may include TCP/IP and network interface handling. Disclosed embodiments may avoid many higher-level programming constructs (e.g., threads and interrupts) that may add overhead. Disclosed embodiments may manipulate various protocol payloads. According to some aspects, these protocols may include web service protocols that may be implemented in various products, such as enterprise resources and services. According to some aspects, these protocols may be XML or JSON documents that may be, for example, transferred/transmitted via HTTP.

According to some aspects, disclosed gateway features may be implemented in the application layer (L7) of the OSI model, which is the layer closest to the end user or client. For example, disclosed gateway embodiments may be inserted into protocol flows so as to stay within any defined semantics that may be understood and/or used by the client side and server side (e.g., enterprise side). This may result in many value added operations, such as reducing chatter to the client, converting or bridging between high level protocols (e.g., mapping legacy protocols to the successor protocols), aggregating multiple resource directories (e.g., of different types and/or versions) into a single resource directory (which may be a virtual directory), and the like.

Disclosed embodiments allow for authentication handling to occur in, for example, the gateway's packet engine. This may allow for optimal performance of common actions, which may be well-defined and rarely changed, while letting more complicated parts of authentication protocols be handled with other components (e.g., off-the-shelf libraries, java servlets, etc.) written for standard operation system environments. For example, the manipulation of high-level protocol payloads may be handled by a java servlet environment hosted on disclosed gateway embodiments. The java servlet environment may be interlinked with the gateway packet engine core, thus allowing the authentication context to be shared across the java servlet and gateway packet engine core, which allows for optimal functionality. According to some aspects, the java servlet may be updated independently from the gateway's updates, thereby allowing upgrades/updates to be implemented on either the java servlet or gateway at different times without affecting the other's performance.

FIG. 5 is an illustrative flow diagram illustrating an example process 500 of authenticating and authorizing client devices in enterprise systems using a gateway device in accordance with one or more features described herein. In one or more embodiments, the process illustrated in FIG. 5 and/or one or more steps thereof may be performed by a computing device (e.g., a client device such as terminal 240, client device 302, and/or enrolled mobile device 402; a gateway device such as access gateway 360, gateway server 406, and/or cloud gateway; and/or an enterprise server machine or device; and the like). In other embodiments, the process illustrated in FIG. 5 and/or one or more steps thereof may be embodied in computer-executable instructions that are stored in a computer-readable medium, such as a non-transitory computer-readable memory. Alternatively or additionally, any of the steps in process 500 may be performed on any client device, gateway device, or enterprise server machine.

Process 500 may begin with step 502, in which a client device, such as client device 302, may initiate an authentication request. The authentication request may be an attempt by the client device 302 to log into the enterprise system using a secured and/or unsecured application running on the client device 302, such as a console application, mobile application, web browser, web-based application, or any other application. A user of the client device 302 may input authentication credentials into client device 302 using an input interface/device of client device 302. For example, the user may use a keyboard or touch screen to input a user identifier and/or password into client device 302. The authentication credentials may be encrypted and/or securely transmitted to a gateway (e.g., gateway 360) of the enterprise system.

Gateway 360 may be a secure server, and may be implemented as one or more separate computing devices. Alternatively, gateway 360 may be implemented within a server or other computing device providing resources or services (e.g., an email server, a web application server, etc.). Gateway 360 may support various additional authentication techniques, such as password-based, token-based (e.g., smart cards, magnetic strip cards, etc.), biometrics (e.g., fingerprint, voice print, iris or retina scanning), and the like. The authentication information transmitted in step 502 may be single-factor or multi-factor authentication information. For example, in multi-factor authentication, a user may provide a password and the user's smart card, but may only need to provide one of these in a single-factor authentication. The authentication may also include multiple authentication steps (e.g., challenge questions) and/or mutual authentication techniques.

At step 504, gateway 360 may receive the login request and authorization information from the client device 302. Gateway 360 may store the authorization information in, for example, a local memory. Gateway 360 may then determine whether the login request is a new login request from client device 302. For example, gateway 360 may determine whether the request is part of and/or associated with an existing communication session with an enterprise resource or service (e.g., by examining a client device's session information, such as a cookie, which will be explained further below). If the login request is for an existing session, gateway 360 may automatically authenticate the client device. If the login request is a new request, then gateway 360 may then determine whether the client device is authorized to log in to the gateway/enterprise system by attempting to authenticate the client device using the received authentication information. In some embodiments, gateway 360 may transmit this authentication information to an authentication service, which may be substantially similar to and/or the same as authentication service 358, and which may or may not be included in the gateway device 360. Gateway 360 may, for example, authenticate client devices by presenting the received authentication credentials to an active directory (such as AD 422), which may rule on the accuracy and/or validity of the authentication credentials.

At step 506, after a successful authentication of client device 302, gateway 360 may then transmit data signaling a successful authentication (e.g., a cookie) to client device 302. For example, the cookie may be a small piece of data sent from gateway 360 and stored on client device 302. The cookie may be a HTTP cookie, web cookie, browser cookie, and the like. The cookie may identify a current session (such as a logged-in session) of client device 302. Session cookies may be generally short lived evidence that the current caller (e.g., the client device) is the same as a previously authorized caller. Session cookies may be generally short lived so that if, for example, the client device is lost or stolen, an attacker cannot continue to log in the gateway/enterprise. In some embodiments, gateway 360 may attach to and/or associate an expiration with a session cookie. For example, a cookie may have a time limit of 5 minutes, such that after 5 minutes, the current login session may be disabled, and client device 302 may need to subsequently log back in to gateway 360. In some embodiments, other session or authentication information may be transmitted from gateway 360 to client device 302 after authentication, such as a token. In some embodiments, the client session may be identified by examining a header of a message, which may include session identifying information.

At step 508, client device 302 may transmit (along with the session cookie) a request to the enterprise system for access to an enterprise resource or service. For example, an application running on client device 302 may request (e.g., purchase) a managed application from the application store enterprise resource (e.g., application store 378). In some embodiments, gateway 360 may receive the request and session cookie from client device 302, inspect the session cookie to determine whether the client device 302 is requesting during a currently active session, and may subsequently pass the request (and session cookie) to the enterprise system. After receiving the request, the enterprise system may then determine whether client device or the request for the enterprise resource is authorized and thereby entitled to access the requested enterprise resource.

For example, additional authorization information, such as an access token, may be required by the enterprise system before the enterprise system grants the client device access to the requested enterprise resource. Thus, in some embodiments, if gateway 360 and/or client device 302 already has an access token, gateway 360 and/or client device 302 may transmit the token with the request, thereby satisfying the enterprise's authorization requirement. In other embodiments, gateway 360 and/or client device 302 may not have or know which token is needed to satisfy the enterprise's authorization requirement, and thus the initial request may not include the enterprise's authorization requirement (e.g., required token). In such cases, the enterprise system may deny the initial request for the enterprise resource, and may transmit this denial to gateway 360. In some embodiments, the enterprise system may transmit an HTTP 401 Unauthorized Status Code with the denial to gateway 360. The 401 denial message may include a reason why the request was denied or include what authorization information is required by the enterprise resource before granting access to that resource. For example, the denial (e.g., in a message header) may state that the requesting application must be a web-based application (such as a browser), what authorization information is needed (e.g., a token for the application store enterprise resource), where the caller (e.g., gateway 360) should look for the authorization information (e.g., make a call to application store's token issuer service to request a token for the application store resource), what service the caller (e.g., gateway 360) should call to login/authenticate the client device with the enterprise resource (e.g., make a call to application store's login service to authenticate client device 302), and the like. The enterprise resource may also transmit an HTTP 300 Multiple Choices Status Code to the gateway device. The 300 status code may indicate the login/authentication methods available to gateway 360 for logging into the requested enterprise service (e.g., Single-Sign On, Password, Kerberos, Smartcard, and the like).

At step 510, the gateway 360 may receive the enterprise's response (e.g., denial of the request) along with any additional information (e.g., 401 denial information) that the enterprise system and/or resource may have transmitted. Gateway 360 may then inspect the response to determine why the request was denied and what information is needed to respond to the denial in order to obtain access to the requested enterprise resource. In this sense, gateway 360 may act as a proxy for client device 302.

At step 512, based on the inspection of the denial, the gateway 360 may transmit to the enterprise system any information that may satisfy the authentication information required by the enterprise system or resource. According to some aspects, gateway 360 may obtain this information (e.g., on behalf of client device 302) by calling an external authentication or claims transform service, and subsequently transmit this obtained information to the enterprise system. According to some other aspects, the information transmitted by gateway 360 may include any information stored locally on gateway 360. For example, at step 504, gateway 360 may store the authentication credentials (e.g., login name, password, PIN, etc.) in, for example, a local memory. Additionally, the enterprise source may transmit to gateway 360 (at step 508) an option to login with the Single-Sign On (SSO) method. In such cases, gateway 360 may choose the SSO login method and may transmit to the enterprise system or source the authentication credentials with the SSO login request. In some cases, if the enterprise resource indicates in the denial to login to the enterprise resource's login service, gateway 360 may transmit this authentication information to the enterprise resource's login service. In some cases, the login service may be part of the enterprise service's authentication service, which may be similar to or the same as authentication service 358. In response to receiving the authentication credentials along with the chosen login method, the enterprise service may authenticate the gateway 360 and/or client device 302. According to some aspects, as mentioned above, the enterprise service may include an authorization service 358 that may further include a login service that may authenticate the gateway 360 and/or client device 302.

According to some aspects, gateway 360 may anticipate that the initial request for an enterprise resource transmitted by client device 302 (e.g., step 508) may be denied by the enterprise system or resource. In such cases, gateway 360 may add authentication credentials (and/or login method) to the transmission of the initial request, thus satisfying any enterprise authentication requirements.

At step 514, after transmitting the authentication credentials to the enterprise service, the gateway 360 may then retrieve the required authorization information needed to access the enterprise service based on the information transmitted in the enterprise's response (e.g., information transmitted with the 401 denial(s)). For example, the application store or application controller enterprise services may require that gateway 360 transmit/provide one or more tokens specific for that enterprise service before granting access to that enterprise service. Gateway 360 may obtain tokens from various sources, such as external servers that may store the required tokens. In some embodiments, gateway 360 may have the required tokens stored in a local memory, and may retrieve the tokens from this local memory. This may happen when the gateway may have previously obtained and stored a required token, such as in a previous or associated session, or earlier in the current session.

In some cases, gateway 360 may retrieve tokens from the enterprise system, such as from an enterprise resource, service, and/or server that may have the required token. In some cases, tokens may be retrieved from the requested enterprise resource. In such cases, the enterprise resource may include a service designed to issue tokens (e.g., a token issuer), and the gateway 360 may retrieve tokens from this token issuer. The token issuer may be a part of the enterprise resource's authentication service. The token issuer may also communicate with the enterprise resource's login service, thereby determining when a gateway or client device is authenticated by the enterprise resource. In some cases, the token issuer may require receiving a token before providing/transmitting tokens to gateway 360, and in such cases, the enterprise resource may transmit to the gateway 360 a token specific for the token issuer in response to a successful authentication of the gateway 360 and/or client device 302. In other cases, gateway 360 may obtain the token required by the token issuer from a different or external source, such as a server, session database, or local memory.

At step 516, gateway 360 may then transmit any required authorization information to the enterprise system or resource. For example, if the enterprise resource's token issuer requires a token, then after retrieving the token for the token issuer, the gateway may transmit this token to the token issuer. In response to this, the token issuer may then transmit a token for the enterprise resource (such as a token for the application store or application controller resource) to the gateway (this may also be performed at step 514). After receiving this token for the application store, gateway 360 may then transmit this token along with the client device's request to access the enterprise resource to the enterprise system or resource, thereby satisfying the required authorization information. In some situations, gateway 360 may transmit the required authorization information and the client device request separately.

At step 518, after receiving the required authorization information (e.g., the required token(s)) and the client device request, the enterprise system and/or resource may then grant the client device 302 access to the requested enterprise resource. For example, if the client device 302 initially requested (e.g., at step 508) access to the application store resource (e.g., App Store 378) to obtain a managed application (e.g., pre-wrapped application 382), then after going through one or more of the previously described steps, the client device 302 may now have access to the application store resource and the managed application. Client device 302 may access the enterprise resource via the gateway 360, such as shown in FIGS. 3 and 4. Process 500 may then end at step 520.

FIG. 6 is an illustrative system 600 illustrating a flow schematic of authenticating and authorizing a client device in enterprise systems using a gateway device in accordance with one or more features described herein. In one or more embodiments, the process illustrated in FIG. 6 and/or one or more steps thereof may be performed by a computing device (e.g., a client device such as terminal 240, mobile device 302, and/or enrolled mobile device 402; a gateway device such as access gateway 360, gateway server 406, and/or cloud gateway; and/or an enterprise server machine or device; and the like). In other embodiments, the process illustrated in FIG. 6 and/or one or more steps thereof may be embodied in computer-executable instructions that are stored in a computer-readable medium, such as a non-transitory computer-readable memory. Alternatively or additionally, any of the steps in shown in or described with respect to system 600 may be performed on any client device, gateway device, or enterprise server machine.

System 600 may include a client device 302. Client device 302 may also include a cookie, which may have been provided to client device 302 by gateway 360. Gateway 360 may have transmitted this cookie to client device 302 in response to a successful authentication of the client device 302 on gateway 360 (e.g., as similarly shown above in steps 502, 504, and 506). In some embodiments, gateway 360 might not establish a session with client device 302, and might not transmit a cookie to client device 302. For example, a session might not be established when the initial authentication (e.g., steps 502 and 504) and request for an enterprise resource or service (e.g., step 508) are part of a larger or other request for enterprise resources(s) or service(s).

System 600 may also include an enterprise resource 606 (such as an application store 378 or application controller 374). The resource 606 may include a store service 608, such as pre-wrapped applications 382 or unwrapped applications 380. Resource 606 may also include an authentication service 610. It is noted that whenever resource 606 is recited herein as performing a method, step, act, function, etc. or having a method, step, act, function, etc. performed on resource 606, any part, element, service, etc. that may comprise and/or be associated with resource 606 may perform such method, step, act, function, etc. or have such method, step, act, function, etc. performed on it.

FIG. 7 is an illustrative schematic of an authentication service 610. Authentication service 610 may be the same as or similar to authentication service 358. Authentication service 610 may include a token issuer service 702 and a login service 704. Token issuer 702 may issue authorization information, such as tokens, for various enterprise/resource services, such as store service 608 as well as additional services not explicitly illustrated. The login service 704 may include various options for authentication/login methods/types, such as password login 706a, Kerberos login 706b, Smartcard login 706c, and Access Gate Single Sign-On (AG SSO) 706d. It noted that any other login/authentication method may implemented according to aspects disclosed herein.

Referring back to FIG. 6, at step 618, after the client device 302 has already been authenticated on gateway 360, the client device 302 may "do something," which may be a request to access service 608 (e.g., obtain an application from the application store). This request may be received by resource 606 (e.g., at the requested service 608). Resource 606 and/or service 608 may then determine whether the client device is authenticated on the resource 606 (and/or enterprise system). In some embodiments, client device 302 may have previously logged into the resource 606, and may already be authentication on the enterprise. As shown in FIG. 6, resource 606 may need to authenticate client device 302 before allowing client device 302 access to store service 608.

At step 620, resource 606 may then transmit a denial of access response to the gateway 360. This denial of access response may be an HTTP response, such as a 401 Unauthorized response status code. The response may also indicate additional information, such as an instruction, what authorization information may be needed, what authentication may be needed, where to obtain/retrieve authorization information, from what component to obtain/retrieve authorization information, and the like. In this example, the denial may indicate that particular authorization information (e.g., a token for resource 606/store service 608 and a token for the token issuer 702) may be needed to access the resource and from where to obtain these tokens. As shown in FIG. 6, resource 606 may indicate to the gateway 360 to talk to the token issuer.

At step 622, after receiving any information transmitted in resource 606's response, gateway may then transmit a GET request (e.g., HTTP request) to the token issuer 702 or authentication service 610 (or other component) for the token needed to access the resource 606.

At step 624, gateway 360 may be denied access by authentication service 610, because the gateway 360 (e.g., acting as a proxy for client device 302) has yet to be authenticated by authentication service 610. Therefore, authentication service 610 may respond to gateway 360's GET request with a denial (e.g., 401 response). This denial may include information, such as instructions regarding how to authenticate with resource 606, where to send authentication credentials, and the like. In this example, the denial may inform gateway 360 of which component(s) or services to communicate with in order to authenticate the gateway 360 (e.g., acting as a proxy for client device 302). As shown in FIG. 6, authentication service 610 may inform gateway 360 to talk to login 704.

At step 626, after receiving any information transmitted in authentication service 610's response, gateway 360 may then make a GET request to login 704 for the token for token issuer 702. It is noted that gateway 360 may make this request to token issuer 702 using the information/instructions transmitted from resource 606 in, for example, step 620 (where resource 606 instructed gateway 360 to get a token for the resource 606 and a token for token issuer 702).

At step 628, after receiving the request to get the token for the token issuer 702, login 704 may then transmit a response to gateway 360 that may include, for example, instructions on how to authenticate, methods for authentication, options for authentication, and the like. This response may be a HTTP 300 Multiple Choices response. In this example, the response may include login methods, such as password 706a, Kerberos 706b, smartcard 706c, and AG SSO 706d. It is noted that any other authentication/login method may be implemented.

At step 630, after receiving the login methods response, gateway 360 may then chose one of these methods. As shown in FIG. 6, gateway 360 may pick the SSO login method, and may try to login (e.g., without transmitting any authentication credentials/information) into authentication service 610.

At step 632, authentication service 610/login 704 may receive the login attempt, and because no authentication credentials were sent with the login attempt, authentication service 610/login 704 may deny the login request/attempt. Authentication service 610/login 704 may then send a denial (e.g., 401 response) to the gateway. This denial may include information, such as why the request was denied, what is required to login using that method, and the like. In this case, the denial may indicate that gateway 360 did not send any authentication credentials with the login request.

At step 634, after receiving the response from authentication service 610/login 704, gateway 360 may then transmit any authentication credentials gateway 360 may have access to and/or previously retrieved (e.g., from a local memory, from servers/devices on which gateway 360 is authenticated, etc.). Such authentication credentials may include the authentication credentials transmitted to gateway 360 by client device 302 when client device 302 authenticated (e.g., logged into) itself with gateway 360 (e.g., steps 502 and 504).

At step 636, after receiving the authentication credentials, authentication service 610/login 704 may then process the authentication credentials to determine whether client device 302 may be authenticated on resource 606. If the authentication is successful, then authentication service 610/login 704 may send a confirm response (e.g., HTTP 200 response) to gateway 360, informing gateway 360 that it (e.g., acting as a proxy for client device 302) has been authenticated on resource 606.

At step 638, gateway 360 may then send an OK response (e.g., HTTP 200 response) to authentication service 610/login 704 that may indicate that gateway 360 now knows it (e.g., acting as a proxy for client device 302) is authenticated on resource 606.

At step 640, authentication service 610 (and/or login 704) may then transmit, to gateway 360, any authorization information (e.g., token 642) needed to access token issuer 702.

At step 644, after receiving token 642, gateway 360 may then send, to authentication service 610/token issuer 702, authorization information for token issuer 702 (e.g., token 642) along with a GET request for a token for the enterprise resource 606/service 608 requested by client device 302 at, for example, step 618.

At step 646, authentication service 610 may receive the authorization information for token issuer 702 (e.g., token 642) along with a GET request for a token for the enterprise service 608. After a successful authorization using token 642, token issuer 702 may then transmit the requested authorization information (e.g., token 648) to gateway 360.

At step 650, after receiving token 648, gateway 360 may then re-send, to the enterprise service 608, the request to access service 608 (e.g., request to obtain an application from the application store) along with token 648.

At step 652, enterprise service 608 may receive the authorization information for service 608 (e.g., token 648) along with the request to access service 608. After a successful authorization using token 648, enterprise service 608 may then grant access to gateway 360 and client device 302. For example, store service 608 may send a requested application to client device 302. At step 654, client device 302 may receive access to the enterprise service 608 (e.g., via gateway 360) by receiving a result for client device 302's request.

In some embodiments, after client device 302 has been authenticated on gateway 360 and on resource 606, client device 302 may make a subsequent request for access to resource 606 (e.g., for the same or another enterprise/resource service). Thus, if this request is made during an active session (e.g., the cookie is still valid and/or unexpired), then gateway 360, after receiving this subsequent request, may retrieve or add authorization information (e.g., tokens, cookies, etc.) for the requested enterprise/resource service, and transmit the request along with the corresponding authorization information to resource 606. In some situations, gateway 360 may retrieve authorization information from external sources, such as enterprise resource 606, other enterprise resources, or other servers/computing devices. For example, if client device 302 is already authenticated on resource 606, then gateway 360 may retrieve the corresponding/required authorization information (e.g., token) from token issuer 702 for any subsequent requests made by client device 302 for additional services provided by resource 606. In some situations, gateway 360 may have previously retrieved/obtained authorization information (e.g., a token) from resource 606, and may have it stored locally. In these situations, if client device 302 request services corresponding to a token that gateway 360 previously obtained, then gateway 360 may not need to perform some or all of the negotiation steps described above. Instead, gateway 360 may retrieve the required token from its local storage, and transmit the retrieved token and request to resource 606.

Figure 8:
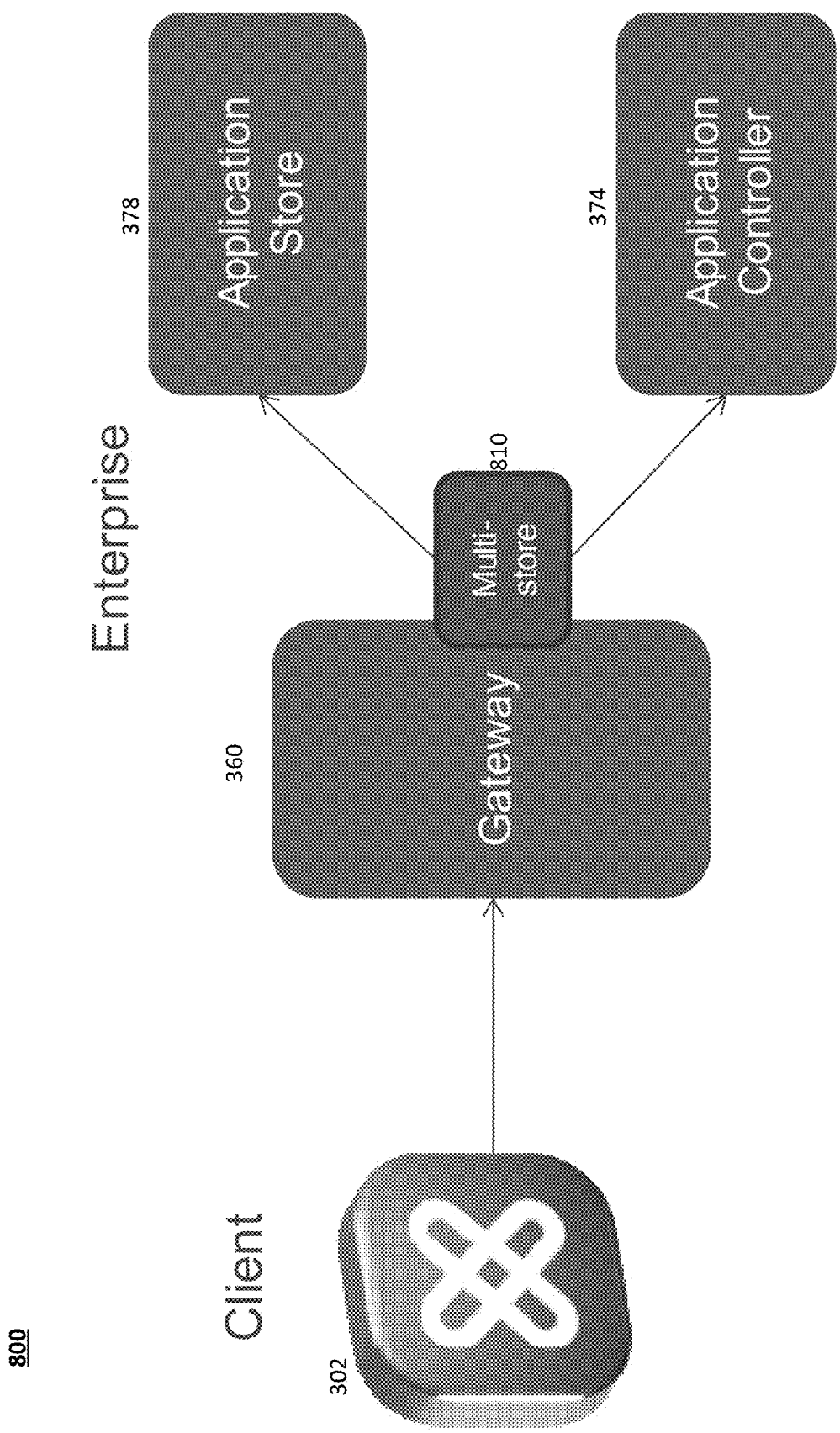
FIG. 8 depicts an illustrative system of authenticating and authorizing client devices in enterprise systems using a gateway device and multistore in accordance with one or more features described herein.

FIG. 8 illustrates an illustrative system 800 of authenticating and authorizing client devices in enterprise systems using a gateway device and a multistore in accordance with one or more features described herein. System 800 may include client device 302, gateway device 360, multistore component 810, enterprise resource 374 (e.g., application controller), and enterprise resource 378 (e.g., application store). According to some aspects, a plurality of enterprise resources, endpoints, and/or products may be aggregated into a multistore component 810 which may be integrated, be a part of, or otherwise associated with gateway 360. According to some aspects, the multistore 810 may then communicate with a plurality of individual enterprise resources on behalf of client 302.

For example, after receiving corresponding/required authorization information (e.g., tokens), such as described herein (e.g., in FIGS. 5-7), gateway 360 may then aggregate, into a multistore, application store 378 resources/applications and application controller 374 resources/applications. In this sense, aggregating resources may include re-writing or otherwise implementing these resources as gateway proxied services (e.g., VPN, cVPN, etc.) such that these resources pair as a single resource/service in a multistore. For example, if there is an image service in application store 378, then an image service may be implemented on the multistore 810 so that the multistore 810 can communicate with the image service in application store 378. Likewise, if there is an image service in application controller 374, the image service implemented on the multistore 810 may also include the capability of communicating with the image service in application controller 374. Thus, the communication between the MultiStore/Gateway and application controller 374 and application store 378 may be the same or similar to the communication as described above with respect to gateway 360 and FIGS. 5-7, but may have increased protocol knowledge due to the proxied services implemented on the MultiStore/Gateway.

According to some aspects, if client device 302 makes a request that may require access to more than one enterprise resource (e.g., application store 378 and application controller 374), gateway 360 (via the multistore 810) may act as a proxy for client device 302 by communicating/negotiating with those resources so that client device 302 does not have to make as many calls it would have to make as if the gateway 360 was not acting as a proxy for client device 302. Thus, if a client device 302 requests access to some applications, and searches for those applications, client device 302 may not know/realize that the search results may be coming from application store 378 and also from application controller 374, because of gateway 360's and/or multistore 810's proxy and communication ability limiting communication between client device 302 and the enterprise resources.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a computing device from a client computing device, authentication credentials associated with the client computing device;
authenticating, by the computing device, the client computing device using the authentication credentials associated with the client computing device;
transmitting, by the computing device and in response to a successful authentication of the client computing device on the computing device, a session cookie to the client computing device, the session cookie authenticating the client computing device on the computing device for a first session;
passing, by the computing device to an enterprise computing device via a network, a request transmitted by the client computing device via the network for access to an enterprise resource computing device;
transmitting, by the computing device to the enterprise computing device, information comprising:
the authentication credentials associated with the client computing device; and
a request for the enterprise computing device to transmit, to the computing device, authorization information associated with the enterprise resource computing device needed for gaining access to the enterprise resource computing device;
receiving, by the computing device and in response to a successful authentication of the authentication credentials associated with the client computing device, the authorization information associated with the enterprise resource computing device needed for gaining access to the enterprise resource computing device;
transmitting, by the computing device to the enterprise resource computing device, the request transmitted by the client computing device for access to the enterprise resource computing device with the authorization information associated with the enterprise resource computing device needed for gaining access to the enterprise resource; and
passing, by the computing device to the client computing device via the network, information associated with the enterprise resource computing device based on the authorization information associated with the enterprise resource computing device needed for gaining access to the enterprise resource computing device.

2. The method of claim 1, further comprising receiving, by the computing device from the enterprise computing device and in response to passing the request transmitted by the client computing device for access to the enterprise resource computing device, a message indicating a denial of the request.

3. The method of claim 2, wherein the message indicating a denial of the request comprises an identification of the authorization information associated with the enterprise resource computing device needed for gaining access to the enterprise resource computing device.

4. The method of claim 3, wherein the message indicating a denial of the request further comprises an identification of a location of where to retrieve the authorization information associated with the enterprise resource computing device needed for gaining access to the enterprise resource computing device.

5. The method of claim 1, wherein the authorization information associated with the enterprise resource computing device needed for gaining access to the enterprise resource computing device comprises one or more tokens, the method further comprising:
   determining, by the computing device based on information within the request transmitted by the client computing device and not based on any additional information provided by the client computing device, whether gaining access to another enterprise resource computing device is needed along with access to the enterprise resource computing device; and
   when it is determined that gaining access to the another enterprise resource computing device is needed, obtaining information associated with the enterprise resource computing device and the another enterprise resource computing device, and providing the information to the client computing device.

6. The method of claim 1, wherein receiving the authorization information associated with the enterprise resource computing device needed for gaining access to the enterprise resource computing device comprises receiving, by the computing device, a first token from a first source and a second token from a second source, the method further comprising:
   transmitting, by the computing device, the first token to the enterprise computing device;
   receiving, by the computing device from the enterprise computing device and based on the first token, access to information associated with the first source;
   transmitting, by the computing device, the second token to the enterprise computing device; and
   receiving, by the computing device from the enterprise computing device and based on the second token, access to information associated with the second source; and
   passing, by the computing device to the client computing device, information associated with at least one of the first and second sources.

7. The method of claim 1, wherein the transmitting, by the computing device to the enterprise computing device, information comprising
authentication credentials associated with the client computing device comprises:
   determining, by the computing device, whether or not first authentication credentials provided by the client computing device to the computing device are sufficient to gain access to the enterprise resource computing device; and
   when the determining is that the first authentication credentials provided by the client computing device to the computing device are insufficient to gain access to the enterprise resource computing device, adding second authentication credentials to the first authentication credentials as the authentication credentials to be sent to the enterprise computing device.

8. The method of claim 6, wherein the first source comprises the enterprise resource computing device and the second source comprises a different enterprise resource computing device.

9. The method of claim 1, further comprising retrieving, by the computing device, the authorization information associated with the enterprise resource computing device needed for gaining access to the enterprise resource computing device from one of a local memory of the computing device and an external source.

10. A system, comprising:
   at least one processor; and
   at least one memory storing instructions that, when executed by the at least one processor, cause the system to perform:
      receiving, by a computing device from a client computing device, authentication credentials associated with the client computing device;
      authenticating, by the computing device, the client computing device using the authentication credentials associated with the client computing device;
      transmitting, by the computing device and in response to a successful authentication of the client computing device on the computing device, a session cookie to the client computing device, the session cookie authenticating the client computing device on the computing device for a first session;
      passing, by the computing device to an enterprise computing device via a
   network, a request transmitted by the client computing device via the network for access to an enterprise resource computing device;
      transmitting, by the computing device to the enterprise computing device, information comprising:
         the authentication credentials associated with the client computing device; and
         a request for the enterprise computing device to transmit to the computing device authorization information associated with the enterprise resource computing device needed for gaining access to the enterprise resource computing device;
      receiving, by the computing device and in response to a successful authentication of the authentication credentials associated with the client computing device, the authorization information associated with the enterprise resource computing device needed for gaining access to the enterprise resource computing device;
      transmitting, by the computing device to the enterprise resource computing device, the request transmitted by the client computing device for access to the enterprise resource computing device with the authorization information associated with the enterprise resource computing device needed for gaining access to the enterprise resource; and
      passing, by the computing device to the client computing device via the network, information associated with the enterprise resource computing device based on the authorization information associated with the enterprise resource computing device needed for gaining access to the enterprise resource computing device.

11. The system of claim 10, wherein the instructions further cause the system to perform receiving, by the computing device from the enterprise computing device and in response to passing the request transmitted by the client computing device for access to the enterprise resource computing device, a message indicating a denial of the request.

12. The system of claim 11, wherein the message indicating a denial of the request comprises an identification of the authorization information associated with the enterprise resource computing device needed for gaining access to the enterprise resource computing device.

13. The system of claim 12, wherein the message indicating a denial of the request further comprises an identification of a location of where to retrieve the authorization information associated with the enterprise resource computing device needed for gaining access to the enterprise resource computing device.

14. The system of claim 10, the instructions further cause the system to perform:
   determining, by the computing device based on information within the request transmitted by the client computing device and not based on any additional information provided by the client computing device, whether gaining access to another enterprise resource computing device is needed along with access to the enterprise resource computing device; and
   when it is determined that gaining access to the another enterprise resource computing device is needed, obtaining information associated with the enterprise resource computing device and the another enterprise resource computing device, and providing the information to the client computing device.

15. The system of claim 10, wherein receiving the authorization information associated with the enterprise resource computing device needed for gaining access to the enterprise resource computing device comprises receiving, by the computing device, a first token from a first source and a second token from a second source, wherein the instructions further cause the system to perform:
   transmitting, by the computing device, the first token to the enterprise computing device;
   receiving, by the computing device from the enterprise computing device and based on the first token, access to information associated with the first source;
   transmitting, by the computing device, the second token to the enterprise computing device; and
   receiving, by the computing device from the enterprise computing device and based on the second token, access to information associated with the second source; and
   passing, by the computing device to the client computing device, information associated with at least one of the first and second sources.

16. One or more non-transitory computer-readable storage media having instructions stored thereon, that when executed by one or more processors, cause the one or more processors to perform:
   receiving, by a computing device from a client computing device, authentication credentials associated with the client computing device;
   authenticating, by the computing device, the client computing device using the authentication credentials associated with the client computing device; and
   transmitting, by the computing device and in response to a successful authentication of the client computing device on the computing device, a session cookie to the client computing device, the session cookie authenticating the client computing device on the computing device for a first session;
   passing, by the computing device to an enterprise computing device via a network, a request transmitted by the client computing device via the network for access to an enterprise resource computing device;
   transmitting, by the computing device to the enterprise computing device via the network, information comprising:
      the authentication credentials associated with the client computing device; and
      a request for the enterprise computing device to transmit to the computing device authorization information associated with the enterprise resource computing device needed for gaining access to the enterprise resource computing device;
   receiving, by the computing device and in response to a successful authentication of the authentication credentials associated with the client computing device, the authorization information associated with the enterprise resource computing device needed for gaining access to the enterprise resource computing device;
   transmitting, by the computing device to the enterprise resource computing device, the request transmitted by the client computing device for access to the enterprise resource computing device with the authorization information associated with the enterprise resource computing device needed for gaining access to the enterprise resource; and
   passing, by the computing device to the client computing device via the network, information associated with the enterprise resource computing device based on the authorization information associated with the enterprise resource computing device needed for gaining access to the enterprise resource computing device.

17. The one or more non-transitory computer-readable storage media of claim 16, wherein receiving the authorization information associated with the enterprise resource computing device needed for gaining access to the enterprise resource computing device comprises receiving, by the computing device, a first token from a first source and a second token from a second source, wherein the instructions further cause the one or more processors to perform:
   transmitting, by the computing device, the first token to the enterprise computing device;
   receiving, by the computing device from the enterprise computing device and based on the first token, access to information associated with the first source;
   transmitting, by the computing device, the second token to the enterprise computing device; and
   receiving, by the computing device from the enterprise computing device and based on the second token, access to information associated with the second source; and
   passing, by the computing device to the client computing device, information associated with at least one of the first and second sources.

* * * * *